United States Patent
Kaneko et al.

(10) Patent No.: US 12,123,108 B2
(45) Date of Patent: Oct. 22, 2024

(54) TREATMENT AGENT FOR SHORT FIBERS, AQUEOUS SOLUTION FOR TREATMENT AGENT FOR SHORT FIBERS, TREATMENT METHOD FOR SHORT FIBERS, PRODUCTION METHOD FOR SHORT FIBERS, AND SHORT FIBERS

(71) Applicant: TAKEMOTO YUSHI KABUSHIKI KAISHA, Aichi-ken (JP)

(72) Inventors: Ikki Kaneko, Gamagori (JP); Yoshihiro Takayama, Gamagori (JP); Tomoya Okada, Gamagori (JP); Hiroko Fujii, Gamagori (JP)

(73) Assignee: TAKEMOTO YUSHI KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 18/576,466

(22) PCT Filed: Jul. 6, 2022

(86) PCT No.: PCT/JP2022/026831
§ 371 (c)(1),
(2) Date: Jan. 4, 2024

(87) PCT Pub. No.: WO2023/282286
PCT Pub. Date: Jan. 12, 2023

(65) Prior Publication Data
US 2024/0263359 A1  Aug. 8, 2024

(30) Foreign Application Priority Data
Jul. 9, 2021  (JP) ................. 2021-114220

(51) Int. Cl.
*D06M 13/188* (2006.01)
*B29C 48/00* (2019.01)
*D01F 11/08* (2006.01)
*D06M 13/192* (2006.01)

(52) U.S. Cl.
CPC .......... *D01F 11/08* (2013.01); *B29C 48/0022* (2019.02); *B29C 2793/00* (2013.01); *C10M 2207/1213* (2013.01); *C10M 2207/122* (2013.01); *C10M 2207/123* (2013.01); *C10M 2207/1233* (2013.01)

(58) Field of Classification Search
CPC ............ B29C 48/0022; B29C 2793/00; C10M 2207/1213; C10M 2207/122; C10M 2207/123; C10M 2207/1233; D01D 5/26; D06M 13/188; D06M 13/192

USPC ....... 264/140, 141, 142, 143, 340; 252/8.84; 508/539
See application file for complete search history.

(56) References Cited

U.S. PATENT DOCUMENTS

| 5,190,676 A | 3/1993 | Yamane et al. |
| 5,873,979 A | 2/1999 | Naieni |

FOREIGN PATENT DOCUMENTS

| JP | S57-128267 A | 8/1982 | |
| JP | S60-081367 A | 5/1985 | |
| JP | S60-224867 A | 11/1985 | |
| JP | H03-174067 A | 7/1991 | |
| JP | H06-108361 A | 4/1994 | |
| JP | H09-510513 A | 10/1997 | |
| JP | 2001-164464 A | 6/2001 | |
| JP | 2008-063713 A | 3/2008 | |
| JP | 2016-199812 A | 12/2016 | |
| JP | 6605833 B2 * | 11/2019 | .......... D06M 13/188 |
| JP | 2020-103403 A | 7/2020 | |
| JP | 2020-109221 A | 7/2020 | |

OTHER PUBLICATIONS

Translation of JP 6605833 B2 (published on Nov. 13, 2019).*
International Search Report and Written Opinion mailed Sep. 6, 2022, in connection with International Application No. PCT/JP2022/026831.
Japanese Office Action issued on Feb. 22, 2022, in connection with the Japanese Patent Application No. 2021-114220.
Japanese Office Action issued on Oct. 19, 2021, in connection with Japanese Patent application No. 2021-114220.
Extended European Search Report dated Aug. 29, 2024, in connection with European Application No. 22837700.8.

* cited by examiner

*Primary Examiner* — Leo B Tentoni
(74) *Attorney, Agent, or Firm* — Wolf, Greenfield & Sacks, P.C.

(57) ABSTRACT

The present invention addresses the problem of improving friction characteristics, when wet, of fibers to which a treatment agent for short fibers is adhered, and improving the heat resistance of the treatment agent for short fibers. This treatment agent for short fibers does not substantially include a phosphate compound, but does contain the fatty acid (A) below and a non-ionic surfactant. The fatty acid (A) is at least one fatty acid selected from C1-6 fatty acids, C1-6 hydroxy fatty acids, and salts of the aforementioned fatty acids.

10 Claims, No Drawings

TREATMENT AGENT FOR SHORT FIBERS, AQUEOUS SOLUTION FOR TREATMENT AGENT FOR SHORT FIBERS, TREATMENT METHOD FOR SHORT FIBERS, PRODUCTION METHOD FOR SHORT FIBERS, AND SHORT FIBERS

CROSS REFERENCE TO RELATED APPLICATIONS

This Application is a national stage filing under 35 U.S.C. 371 of International Patent Application Serial No PCT/JP2022/026831, filed Jul. 6, 2022, which claims priority to Japanese application number 2021-114220 filed, Jul. 9, 2021. The entire contents of these applications are incorporated herein by reference in their entirety.

TECHNICAL FIELD

The present invention relates to a short fiber treatment agent, an aqueous liquid of short fiber treatment agent, a method for treating a short fiber, a method for producing a short fiber, and a short fiber.

BACKGROUND ART

In a spinning and drawing step or a finishing step for, for example, synthetic fibers, a fiber treatment agent may be adhered to the fiber surface from a standpoint of reducing friction of the fibers.

Known oil agents for fiber are disclosed in Patent Documents 1 to 4.

Patent Document 1 discloses an oil agent for fiber constituted by blending a potassium salt of an alkyl phosphoric acid ester and a phosphoric acid neutralization product of a compound having ethylene oxide added to an alkyl amine or substituted alkyl amine having an alkyl group with 8 to 18 carbon atoms.

Patent Document 2 discloses an oil agent for fiber containing an organic phosphoric acid ester salt and an oxyalkylene polymer.

Patent Document 3 discloses an oil agent for fiber containing an alkyl phosphoric acid ester potassium salt, a paraffin wax, and a cationic surfactant.

Patent Document 4 discloses an oil agent for fiber containing an alkyl phosphoric acid ester potassium salt and a polyoxyalkylene alkyl ether.

CITATION LIST

Patent Literature

Patent Document 1: Japanese Laid-Open Patent Publication No. S60-224867
Patent Document 2: Japanese Laid-Open Patent Publication No. H03-174067
Patent Document 3: Japanese Laid-Open Patent Publication No. H06-108361
Patent Document 4: Japanese Laid-Open Patent Publication No. 2008-063713

SUMMARY OF INVENTION

Technical Problem

However, further improvement of the friction characteristic in a wet state of short fibers with a short fiber treatment agent adhered thereto and further improvement of the heat resistance of the short fiber treatment agent have been sought.

Solution to Problem

A short fiber treatment agent for solving the above problem is substantially free of an organic phosphoric acid ester compound and contains a fatty acid (A) and a nonionic surfactant (B). The fatty acid (A) is at least one selected from the group consisting of a fatty acid with 1 to 6 carbon atoms, a hydroxy fatty acid with 1 to 6 carbon atoms, and a salt thereof.

The short fiber treatment agent is preferably such that the content of phosphorus detected by an ICP emission spectrometry is not more than 2,000 ppm.

The short fiber treatment agent is preferably such that the fatty acid (A) is at least one selected from the group consisting of a fatty acid with 1 to 4 carbon atoms, a hydroxy fatty acid with 1 to 4 carbon atoms having a hydroxy group in its molecule, and an alkali metal salt thereof.

A nonionic surfactant (B1) is contained in the short fiber treatment agent in an amount of at least 50% by mass or more based on the total mass of the nonionic surfactant (B). The nonionic surfactant (B1) is a compound in which an alkylene oxide with 2 to 4 carbon atoms is added at a ratio of 3 to 30 moles with respect to 1 mole of a monohydric or dihydric alcohol.

If the sum of the contents of the fatty acid (A) and the nonionic surfactant (B) in the short fiber treatment agent is taken as 100 parts by mass, the short fiber treatment agent contains the fatty acid (A) at a ratio of not less than 0.001 parts by mass and not more than 10 parts by mass and the nonionic surfactant (B) at a ratio of not less than 90 parts by mass and not more than 99.999 parts by mass.

With the short fiber treatment agent, the short fiber is preferably a polyester short fiber.

With the short fiber treatment agent, the short fiber is preferably for spun yarn production.

The short fiber treatment agent is preferably used in a spinning and drawing step.

An aqueous liquid of short fiber treatment agent for solving the above problem contains the short fiber treatment agent and water.

A method for treating a short fiber for solving the above problem includes applying to a short fiber an aqueous liquid of short fiber treatment agent in which the short fiber treatment agent is mixed with water.

A method for producing a short fiber for solving the above problem includes applying to a short fiber an aqueous liquid of short fiber treatment agent in which the short fiber treatment agent is mixed with water in a spinning and drawing step.

A short fiber for solving the above problem has the short fiber treatment agent adhered thereto.

Advantageous Effects of Invention

The present invention succeeds in improving the friction characteristic in a wet state of short fibers with a short fiber treatment agent adhered thereto and improving the heat resistance of the short fiber treatment agent.

DESCRIPTION OF EMBODIMENTS

First Embodiment

A first embodiment that embodies a short fiber treatment agent according to the present invention (also referred to hereinafter simply as treatment agent) will now be described.

The treatment agent of the present embodiment contains a fatty acid (A) and a nonionic surfactant (B).

(Fatty Acid (A))

The fatty acid (A) is at least one selected from the group consisting of a fatty acid with 1 to 6 carbon atoms, a hydroxy fatty acid with 1 to 6 carbon atoms, and a salt thereof.

By the fatty acid (A) being the above-described compound, the friction in a wet state of short fibers with the treatment agent adhered thereto can be improved. In other words, the friction characteristic in the wet state can be improved. Also, the heat resistance of the treatment agent can be improved.

A fatty acid with 1 to 6 carbon atoms that constitutes the fatty acid (A) may be a known fatty acid and may be a saturated fatty acid or an unsaturated fatty acid. It may also be of straight chain form or have a branched chain structure. It may also be a monobasic fatty acid or a dibasic fatty acid.

Specific examples of the fatty acids with 1 to 6 carbon atoms include methanoic acid, ethanoic acid (acetic acid), butanoic acid, propanoic acid (propionic acid), pentanoic acid, hexanoic acid, and butanedioic acid (succinic acid).

A hydroxy fatty acid with 1 to 6 carbon atoms that constitutes the fatty acid (A) may be a known hydroxy fatty acid and may be a saturated hydroxy fatty acid or an unsaturated hydroxy fatty acid. It may also be of straight chain form or have a branched chain structure. It may also be a monobasic hydroxy fatty acid or a dibasic hydroxy fatty acid.

Specific examples of the hydroxy fatty acid with 1 to 6 carbon atoms include hydroxyethanoic acid, hydroxypropanoic acid (lactic acid), hydroxybutanoic acid, hydroxypentanoic acid, hydroxyhexanoic acid, citric acid, and 2,3-dihydroxybutanedioic acid (tartaric acid).

A salt that constitutes the fatty acid (A) may be a known salt and is preferably a metal salt. Examples of the metal salt include an alkali metal salt and an alkaline earth metal salt. Among these, an alkali metal salt is more preferable.

Examples of an alkali metal that constitutes the alkali metal salt include sodium, potassium, and lithium.

Examples of an alkaline earth metal that constitutes the alkaline earth metal salt include calcium, magnesium, beryllium, strontium, and barium.

The fatty acid (A) is preferably at least one selected from the group consisting of a fatty acid with 1 to 4 carbon atoms, a hydroxy fatty acid with 1 to 4 carbon atoms having a hydroxy group in its molecule, and an alkali metal salt thereof. By the fatty acid (A) being any of the abovementioned compounds, the heat resistance of the treatment agent can be further improved.

Also, by the fatty acid (A) being an alkali metal salt of a fatty acid with 1 to 4 carbon atoms or an alkali metal salt of a hydroxy fatty acid with 1 to 4 carbon atoms having a hydroxy group in its molecule, the friction characteristic in the wet state can be further improved.

One type of the fatty acid (A) may be used alone or two or more types of the fatty acids (A) may be used in combination as appropriate.

(Nonionic Surfactant (B))

Examples of the nonionic surfactant (B) include a compound in which an alkylene oxide is added to an alcohol or a carboxylic acid, an ether-ester compound in which an alkylene oxide is added to an ester compound of a carboxylic acid and a polyhydric alcohol. Hereinafter, these compounds shall also be referred to as (poly)oxyalkylene derivatives.

The alcohol or carboxylic acid may be an alcohol or carboxylic acid of an aliphatic system with a straight chain form or having a branched chain or may be an alcohol or carboxylic acid of an aromatic system. It may also be a saturated alcohol or carboxylic acid or an unsaturated alcohol or carboxylic acid. It may also be an alcohol or carboxylic acid that is monovalent or divalent or higher.

The nonionic surfactant (B) preferably contains at least 50% by mass or more of a nonionic surfactant (B1) with respect to the total mass of the nonionic surfactant (B). The nonionic surfactant (B1) is a compound in which an alkylene oxide with 2 to 4 carbon atoms is added at a ratio of 3 to 30 moles with respect to 1 mole of a monohydric or dihydric alcohol.

By the nonionic surfactant (B) containing the nonionic surfactant (B1) at not less than 50% by mass, the wettability of the treatment agent can be further improved.

Specific examples of the alkylene oxide with 2 to 4 carbon atoms include ethylene oxide, propylene oxide, and butylene oxide.

The number of added moles of the alkylene oxide represents the number of moles of the alkylene oxide with respect to 1 mole of an alcohol compound or carboxylic acid compound in the charged raw materials.

One type of the alkylene oxide may be used alone or two or more types of the alkylene oxides may be used in combination as appropriate. If two or more types of the alkylene oxide are used, an addition form thereof may be any of block addition, random addition, and a combination of block addition and random addition and is not particular limited.

Specific examples of the (poly)oxyalkylene derivative that is the nonionic surfactant (B) include polyoxyethylene alkyl ethers, polyoxyethylene alkenyl ethers, polyoxyethylene alkyl esters, polyoxyethylene alkenyl esters, polyoxyethylene alkyl phenyl ethers, polyoxyalkylene alkyl amino ethers, polyoxyalkylene alkenyl amino ethers, salts of polyoxyalkylene alkyl amino ethers and inorganic acids, and salts of polyoxyalkylene alkenyl amino ethers and inorganic acids.

One type of the (poly)oxyalkylene derivative may be used alone or two or more types of the (poly)oxyalkylene derivatives may be used in combination as appropriate.

The treatment agent is substantially free of an organic phosphoric acid ester compound. Substantially free shall mean that an organic phosphoric acid ester compound is allowed to be contained at an impurity level. As the content of such an impurity level, for example, the content of phosphorus, in other words, a concentration of the P element detected when the treatment agent is measured by an ICP emission spectrometry is preferably not more than 2,000 ppm and more preferably not more than 1,000 ppm.

By being substantially free of an organic phosphoric acid ester compound, it becomes possible to perform waste liquid treatment in production of short fibers using the treatment agent more easily.

Examples of the organic phosphoric acid ester compound include an alkyl phosphoric acid ester, an alkenyl phosphoric acid ester, an alkyl phosphoric acid ester or alkenyl phosphoric acid ester having a polyoxyalkylene group, and a salt of any of these. An alkyl group constituting the alkyl phosphoric acid ester or an alkenyl group constituting the alkenyl phosphoric acid ester is not particular limited and may be of straight chain form or have a branched chain structure. A branching position in the branched chain structure is not particular limited and may be an α-position or a β-position.

The number of carbon atoms of the alkyl group or the alkenyl group is not particular restricted and is, for example, 1 to 30.

Specific examples of the alkyl group include a methyl group, an ethyl group, a propyl group, a butyl group, a pentyl group, a hexyl group, a heptyl group, an octyl group, a decyl group, an undecyl group, a dodecyl group, a tridecyl group, a tetradecyl group, a pentadecyl group, a hexadecyl group, a heptadecyl group, an octadecyl group, an icosyl group, an isobutyl group, an isopentyl group, an isohexyl group, an isoheptyl group, an isooctyl group, an isodecyl group, an isoundecyl group, an isododecyl group, an isotridecyl group, an isotetradecyl group, an isopentadecyl group, an isohexadecyl group, an isoheptadecyl group, an isooctadecyl group, and an isoicosyl group.

Specific examples of the alkenyl group include a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, an icosenyl group, an isobutenyl group, an isopentenyl group, an isohexenyl group, an isoheptenyl group, an isooctenyl group, an isononenyl group, an isodecenyl group, an isoundecenyl group, an isododecenyl group, an isotridecenyl group, an isotetradecenyl group, an isopentadecenyl group, an isohexadecenyl group, an isoheptadecenyl group, an isooctadecenyl group, and an isoicosenyl group.

A phosphoric acid that constitutes the organic phosphoric acid ester compound is not particular limited and may be orthophosphoric acid or a polyphosphoric acid, such as diphosphoric acid.

If an organic phosphoric acid ester salt is contained as the organic phosphoric acid ester compound, example of such a salt include a phosphoric acid ester amine salt and a phosphoric acid ester metal salt.

Examples of the metal salt include an alkali metal salt or an alkaline earth metal salt. Specific examples of an alkali metal that constitutes the alkali metal salt include sodium, potassium, and lithium. Examples of an alkaline earth metal that constitutes the alkaline earth metal salt include a metal corresponding to being a Group II element, for example, calcium, magnesium, beryllium, strontium, and barium.

An amine that constitutes the amine salt may be any of a primary amine, a secondary amine, and a tertiary amine. Specific examples of the amine that constitutes the amine salt include (1) aliphatic amines such as methylamine, dimethylamine, trimethylamine, ethylamine, diethylamine, triethylamine, N—N-diisopropylethylamine, butylamine, dibutylamine, 2-methylbutylamine, tributylamine, octylamine, and dimethyllaurylamine, (2) aromatic amines or heterocyclic amines such as aniline, N-methylbenzylamine, pyridine, morpholine, piperazine, and derivatives of the above, (3) alkanolamines such as monoethanolamine, N-methylethanolamine, diethanolamine, triethanolamine, isopropanolamine, diisopropanolamine, triisopropanolamine, dibutylethanolamine, butyldiethanolamine, octyldiethanolamine, and lauryldiethanolamine, (4) polyoxyalkylene alkyl aminoethers, such as polyoxyethylene lauryl aminoethers and polyoxyethylene stearyl aminoethers, and (5) ammonia.

If an organic phosphoric acid ester compound with an alkylene oxide chain added is used, an alkylene oxide with 2 to 4 carbon atoms can be cited. Specific examples of the alkylene oxide include ethylene oxide, propylene oxide, and butylene oxide. A lower limit of the number of added moles of the alkylene oxide is set as appropriate and, for example, is not less than 0.1 mole. An upper limit of the number of added moles is set as appropriate and, for example, is not more than 50 moles. The number of added moles of the alkylene oxide represents the number of moles of the alkylene oxide with respect to 1 mole of an aliphatic alcohol compound in the charged raw materials.

One type of the alkylene oxide may be used alone or two or more types of the alkylene oxides may be used in combination as appropriate. If two or more types of the alkylene oxide are used, the addition form thereof may be any of block addition, random addition, and a combination of block addition and random addition and is not particular limited.

(Contents)

If the sum of the contents of the fatty acid (A) and the nonionic surfactant (B) in the treatment agent is taken as 100 parts by mass, the treatment agent contains the fatty acid (A) at a ratio of preferably not less than 0.001 parts by mass and not more than 10 parts by mass and the nonionic surfactant (B) at a ratio of preferably not less than 90 parts by mass and not more than 99.999 parts by mass.

In one aspect of the present embodiment, the content of the fatty acid (A) in the treatment agent is, for example, 0.01 parts by mass or more, 0.05 parts by mass or more, 0.1 parts by mass or more, 0.2 parts by mass or more, 0.5 parts by mass or more, 1 part by mass or more, 2 parts by mass or more, or 5 parts by mass or more with respect to 100 parts by mass of the treatment agent. Likewise, the content of the fatty acid (A) in the treatment agent is, for example, 11 parts by mass or less, 5 parts by mass or less, 2 parts by mass or less, 1 part by mass or less, 0.5 parts by mass or less, 0.2 parts by mass or less, 0.1 parts by mass or less, or 0.05 parts by mass or less with respect to 100 parts by mass of the treatment agent.

In one aspect of the present embodiment, the content of the nonionic surfactant (B) in the treatment agent is, for example, 89 parts by mass or more, 95 parts by mass or more, 98 parts by mass or more, 99 parts by mass or more, 99.5 parts by mass or more, 99.8 parts by mass or more, 99.9 parts by mass or more, or 99.95 parts by mass or more with respect to 100 parts by mass of the treatment agent. Likewise, the content of the nonionic surfactant (B) in the treatment agent is, for example, 99.99 parts by mass or less, 99.95 parts by mass or less, 99.9 parts by mass or less, 99.8 parts by mass or less, 99.5 parts by mass or less, 99 parts by mass or less, 98 parts by mass or less, or 95 parts by mass or less with respect to 100 parts by mass of the treatment agent.

The method for measuring the contents of the respective ingredients is not particular limited, and the contents of ionic ingredients may be measured by, for example, the following method. That is, the treatment agent is heated for 2 hours at 105° C. to obtain a nonvolatile content. Sufficient dilution with pure water is performed such that the content of ionic ingredients in the nonvolatile content becomes not more than 500 ppm. Ion chromatography analysis is performed using the dilute liquid.

The operation and effects of the short fiber treatment agent of the first embodiment shall now be described.

(1-1) The short fiber treatment agent of the first embodiment contains a specific fatty acid (A) and a nonionic surfactant (B) and is substantially free of an organic phosphoric acid ester compound. Therefore, the friction characteristic in a wet state of short fibers with the treatment agent adhered thereto can be improved. When used as, for example, a treatment agent for drawing step that is used in a drawing step of a tow sheet in production of short fibers, friction between fibers and metal is reduced to enable the tow to be spread thinly with uniform thickness. Productivity and quality can thereby be improved. Also, the heat resistance of the treatment agent is improved.

(1-2) The fatty acid (A) is at least one selected from the group consisting of a fatty acid with 1 to 4 carbon atoms, a hydroxy fatty acid with 1 to 4 carbon atoms having a hydroxy group in its molecule, and an alkali metal salt thereof. By the fatty acid (A) being any of the abovementioned compounds, the heat resistance of the treatment agent can be further improved.

(1-3) The nonionic surfactant (B) contains at least 50% by mass or more of a nonionic surfactant (B1) with respect to the total mass of the nonionic surfactant (B). The nonionic surfactant (B1) is a compound in which an alkylene oxide with 2 to 4 carbon atoms is added at a ratio of 3 to 30 moles with respect to 1 mole of a monohydric or dihydric alcohol.

By the nonionic surfactant (B) containing the nonionic surfactant (B1) at not less than 50% by mass, the wettability of the treatment agent can be further improved.

Second Embodiment

Next, a second embodiment that embodies a method for treating a short fiber according to the present invention and a method for producing a short fiber according to the present invention will be described.

The method for treating a short fiber of the present embodiment is characterized by applying to a fiber an aqueous liquid of short fiber treatment agent (also referred to hereinafter as aqueous liquid) that contains the short fiber treatment agent of the first embodiment and water. The method for producing a short fiber of the present embodiment is characterized by applying to a fiber the aqueous liquid in a spinning and drawing step.

It is preferable that the aqueous liquid is prepared by adding the short fiber treatment agent of the first embodiment to water. The aqueous liquid is prepared, for example, by adding the treatment agent to water such that the nonvolatile concentration is not less than 0.01% by mass and not more than 10% by mass. The nonvolatile content is determined from the absolute dry mass of the object that has been heat-treated at 105° C. for 2 hours to sufficiently remove volatile substances.

A known method can be used as appropriate as a method for adding the treatment agent to water, and steps 1 and 2 described below are preferably undertaken. When the treatment agent is of emulsion form, the stability of the emulsion can be further improved by this method.

Step 1 is a step of adding the treatment agent to a first water to prepare a mother liquid of the aqueous liquid of short fiber treatment agent with a nonvolatile concentration of more than 2% by mass but not more than 10% by mass. The temperature of the water for diluting is not particular restricted.

In step 1, the first water is heated to 60° C. to 95° C., to which the treatment agent is added and stirred. When the treatment agent is of emulsion form, the stability of the emulsion can be further improved by this method.

Step 2 is a step of adding a second water to the mother liquid of the aqueous liquid of short fiber treatment agent prepared in step 1 to prepare an aqueous liquid with a nonvolatile concentration of not less than 0.01% by mass and not more than 2% by mass.

The method for treating a short fiber is a method in which the aqueous liquid obtained as described above is applied to a short fiber. The method for producing a short fiber is a method in which the aqueous liquid obtained as described above is applied to a short fiber, for example, in a spinning or drawing step or a finishing step.

The type of a short fiber to which the aqueous liquid is applied is not particular restricted. This is because, by the aqueous liquid applied to the short fiber, the short fiber treatment agent ultimately covers the short fiber surface and improves the friction characteristic. Example of the short fiber to which the aqueous liquid is applied include a synthetic fiber, a natural fiber, and a regenerated fiber.

The synthetic fiber is not particularly limited, and specific examples thereof include (1) a polyester fiber, such as polyethylene terephthalate (PET), polytrimethylene terephthalate, polybutylene terephthalate, polyethylene naphthalate, polylactic acid, or a composite fiber containing these polyester resins, (2) a polyamide fiber, such as nylon 6 or nylon 66, (3) a polyacrylic fiber, such as polyacrylic or modacrylic, and (4) a polyolefin fiber, such as polyethylene or polypropylene. Specific examples of the natural fiber and the regenerated fiber include a cotton fiber, a bleached cotton fiber, a viscose rayon fiber, a high tenacity rayon fiber, a super high tenacity rayon fiber, a high wet modulus rayon fiber, a solvent spun rayon fiber, a polynosic fiber, a cupra fiber, and an acetate fiber. Among these, it is preferably applied to a polyester fiber or a polyolefin fiber that especially requires imparting of friction characteristic between fibers in the production process.

Short fibers correspond to those that are generally called staples and do not include long fibers that are generally called filaments. The length of the short fiber is not particularly restricted as long as it corresponds to that of short fibers in the art and, for example, is preferably not more than 100 mm. Among these, it is preferably applied to a polyester short fiber. The short fiber is preferably for spun yarn production.

The ratio of adhering the aqueous liquid to the short fibers is not particularly limited, and the aqueous liquid is adhered such that a solids content would ultimately be of a ratio of preferably not less than 0.1% by mass and not more than 3% by mass with respect to the short fiber. By such arrangement, effects due to the respective ingredients can be exhibited effectively. The method for adhering the aqueous liquid is not particular limited, and a known method such as a roller oiling method, a guide oiling method using a metering pump, an immersion oiling method, or a spray oiling method can be used in accordance with, for example, type, form, or use of the short fiber.

The short fiber to which the aqueous liquid is applied may be dried using a known method. Water or other solvent is volatilized by the drying and a short fiber with the ingredients contained in the treatment agent adhered thereto is obtained.

The operation and effects of the method for treating a short fiber of the second embodiment will now be described. The present embodiment has the following effects in addition to the effects of the first embodiment.

(2-1) In the method for treating a short fiber of the present embodiment, the aqueous liquid is prepared, for example, by adding the treatment agent to water such that the nonvolatile concentration is not less than 0.01% by mass and not more than 10% by mass. Therefore, if the treatment agent is of emulsion form, the stability of the emulsion can be improved. Also, since the aqueous liquid that is the form of application can be prepared by mixing the treatment agent, which has been prepared in advance, with water, the aqueous liquid can be prepared simply in comparison to a method of concocting from reagents at the time of use.

(2-2) If the step of adding the treatment agent to water to prepare a mother liquid of the aqueous liquid of short fiber treatment agent with a nonvolatile concentration of more than 2% by mass but not more than 10% by mass is undertaken, the stability of the emulsion can be further improved. The effects due to the respective ingredients can thereby be exhibited effectively without decreasing uniform adherability of the ingredients to a short fiber.

The above-described embodiments may be modified as follows. The above-described embodiments and modifications described below can be implemented upon being combined with each other within a range that is not technically inconsistent.

Each treatment agent or aqueous liquid of the embodiments may further include an solvent, a stabilizer, an antistatic agent, a binder, an antioxidant, an ultraviolet absorber, or another ingredients that is ordinarily used in the treatment agent for quality maintenance of the treatment agent or the aqueous liquid within a range that does not impair the effects of the present invention.

Among polyoxyalkylene alkyl phenyl ethers included in the (poly)oxyalkylene derivative, polyoxyethylene nonyl phenyl ether is preferably of low amount in the short fiber treatment agent from a standpoint of environmental characteristics. Specifically, it is preferably of not more than 1% by mass and more preferably not substantially contained in the short fiber treatment agent. Substantially not being contained means that polyoxyethylene nonyl phenyl ether is not to be blended separately and does not exclude a small amount of polyoxyethylene nonyl phenyl ether that is contained in the respective raw materials as impurity. By the arrangements of the short fiber treatment agent of the embodiments described above, even with a short fiber treatment agent in which polyoxyethylene nonyl phenyl ether is of low amount, the friction characteristic can be improved by the fatty acid (A).

In regard to the preparation of the aqueous liquid in the method for treating a short fiber of the embodiment, it is preferable from a standpoint of defoaming property during short fiber production and improvement of spinning performance of the fibers to further add a silicone composition in any of the steps 1 and 2 of preparing the aqueous liquid. The silicone composition is not particularly restricted, and specific examples thereof include polydimethylsiloxane and polyoxyethylene modified silicone. From a standpoint of stability of the aqueous liquid, step 2 is more preferable as the step in which the silicone composition is added.

Although the treatment agent of each of the embodiments is used alone as the treatment agent, there is no restriction to this mode. For example, it may be used upon being mixed with another treatment agent during use. The other treatment agent may be used as a first treatment agent and the treatment agent of each of the embodiments may be used as a second treatment agent. The first treatment agent may contain, for example, the above-described organic phosphoric acid ester compound. The fatty acid (A) may be contained in either or both of the first treatment agent and the second treatment agent.

EXAMPLES

Examples will now be given below to describe the features and effects of the present invention more specifically, but the present invention is not limited to these examples. In the following description of working examples and comparative examples, parts means parts by mass and % means % by mass unless otherwise noted.

Experimental Part 1 (Preparation of Treatment Agents)

Treatment agents were prepared using the respective ingredients shown in Tables 1 and 2 and by a preparation method described below.

As the fatty acids (A), A-1 to A-8, a-1, and a-2 indicated in Table 1 were used.

The type, number of carbon atoms, and number of hydroxy groups of each fatty acid (A) are respectively indicated in the "Fatty acid (A)" column, the "Number of carbon atoms" column, and the "Number of hydroxy groups" column of Table 1.

TABLE 1

| Category | Fatty acid (A) | Number of carbon atoms | Number of hydroxy groups |
| --- | --- | --- | --- |
| A-1 | Potassium acetate | 2 | 0 |
| A-2 | Potassium propionate | 3 | 0 |
| A-3 | Potassium lactate | 3 | 1 |
| A-4 | Acetic acid | 2 | 0 |
| A-5 | Lactic acid | 3 | 1 |
| A-6 | Succinic acid | 4 | 0 |
| A-7 | Potassium hexanoate | 6 | 0 |
| A-8 | Potassium citrate | 6 | 1 |
| a-1 | Potassium oleate | 18 | 0 |
| a-2 | Potassium laurate | 12 | 0 |

Example 1

Respective ingredients were weighed out to provide 0.1 parts of potassium acetate (A-1) and 99.9 parts of polyoxyethylene (10 moles) lauryl ether (B-1) as shown in Table 2. These were stirred and mixed to prepare a treatment agent of Example 1.

Examples 2 to 50 and Comparative Examples 1 to 3

Treatment agents of Examples 2 to 50 and Comparative Examples 1 to 3 were prepared in accordance with the same procedure as the treatment agent of Example 1 such as to contain the respective ingredients at ratios indicated in Table 2.

The type and content of each fatty acid (A) and the type and content of each nonionic surfactant (B) are respectively indicated in the "Fatty acid (A)" column and the "Nonionic surfactant (B)" column of Table 2.

TABLE 2

| Category | Fatty acid (A) Type | Parts by mass | Nonionic surfactant (B) Type | Parts by mass | Phosphorus content (three-step evaluation) | Performance Wet-state friction characteristic | Wettability | Heat resistance |
|---|---|---|---|---|---|---|---|---|
| Example 1 | A-1 | 0.1 | B-1 | 99.9 | ○○○ | ◎ | ◎ | ◎ |
| Example 2 | A-1 | 0.1 | B-4 | 99.9 | ○○○ | ◎ | ◎ | ◎ |
| Example 3 | A-1 | 0.1 | B-7 | 99.9 | ○○○ | ◎ | ◎ | ◎ |
| Example 4 | A-1 | 0.1 | B-10 | 99.9 | ○○○ | ◎ | ◎ | ◎ |
| Example 5 | A-2 | 0.1 | B-2 | 99.9 | ○○○ | ◎ | ◎ | ◎ |
| Example 6 | A-2 | 0.1 | B-5 | 99.9 | ○○○ | ◎ | ◎ | ◎ |
| Example 7 | A-2 | 0.1 | B-8 | 99.9 | ○○○ | ◎ | ◎ | ◎ |
| Example 8 | A-2 | 0.1 | B-11 | 99.9 | ○○○ | ◎ | ◎ | ◎ |
| Example 9 | A-3 | 0.1 | B-3 | 99.9 | ○○○ | ◎ | ◎ | ◎ |
| Example 10 | A-3 | 0.1 | B-6 | 99.9 | ○○○ | ◎ | ◎ | ◎ |
| Example 11 | A-3 | 0.1 | B-9 | 99.9 | ○○○ | ◎ | ◎ | ◎ |
| Example 12 | A-3 | 0.1 | B-12 | 99.9 | ○○○ | ◎ | ◎ | ◎ |
| Example 13 | A-2 | 0.01 | B-1 | 99.99 | ○○○ | ◎ | ◎ | ◎ |
| Example 14 | A-3 | 0.01 | B-2 | 99.99 | ○○○ | ◎ | ◎ | ◎ |
| Example 15 | A-1 | 0.05 | B-3 | 99.95 | ○○○ | ◎ | ◎ | ◎ |
| Example 16 | A-2 | 0.05 | B-4 | 99.95 | ○○○ | ◎ | ◎ | ◎ |
| Example 17 | A-3 | 0.5 | B-5 | 99.5 | ○○○ | ◎ | ◎ | ◎ |
| Example 18 | A-1 | 0.5 | B-6 | 99.5 | ○○○ | ◎ | ◎ | ◎ |
| Example 19 | A-2 | 1 | B-7 | 99 | ○○○ | ◎ | ◎ | ◎ |
| Example 20 | A-3 | 1 | B-8 | 99 | ○○○ | ◎ | ◎ | ◎ |
| Example 21 | A-1 | 2 | B-9 | 98 | ○○○ | ◎ | ◎ | ◎ |
| Example 22 | A-2 | 2 | B-10 | 98 | ○○○ | ◎ | ◎ | ◎ |
| Example 23 | A-3 | 2 | B-11 | 98 | ○○○ | ◎ | ◎ | ◎ |
| Example 24 | A-1 | 0.01 | B-11 | 99.99 | ○○○ | ◎ | ◎ | ◎ |
| Example 25 | A-2 | 0.01 | B-12 | 99.99 | ○○○ | ◎ | ◎ | ◎ |
| Example 26 | A-3 | 0.05 | B-13 | 99.95 | ○○○ | ◎ | ◎ | ◎ |
| Example 27 | A-3 | 0.05 | B-14 | 99.95 | ○○○ | ◎ | ◎ | ◎ |
| Example 28 | A-3 | 0.5 | B-15 | 99.5 | ○○○ | ◎ | ◎ | ◎ |
| Example 29 | A-1 | 0.5 | B-16 | 99.5 | ○○○ | ◎ | ◎ | ◎ |
| Example 30 | A-3 | 0.5 | B-17 | 99.5 | ○○○ | ◎ | ◎ | ◎ |
| Example 31 | A-2 | 0.5 | B-18 | 99.5 | ○○○ | ◎ | ◎ | ◎ |
| Example 32 | A-3 | 0.5 | B-19 | 99.5 | ○○ | ◎ | ◎ | ◎ |
| Example 33 | A-3 | 0.5 | B-20 | 99.5 | ○○ | ◎ | ◎ | ◎ |
| Example 34 | A-4 | 0.1 | B-12 | 99.9 | ○○○ | ○ | ◎ | ◎ |
| Example 35 | A-5 | 0.2 | B-13 | 99.8 | ○○○ | ○ | ◎ | ◎ |
| Example 36 | A-6 | 0.5 | B-14 | 99.5 | ○○○ | ○ | ◎ | ◎ |
| Example 37 | A-7 | 1 | B-15 | 99 | ○○○ | ○ | ◎ | ○ |
| Example 38 | A-8 | 5 | B-16 | 95 | ○○○ | ○ | ◎ | ○ |
| Example 39 | A-1 | 11 | B-18 | 89 | ○○○ | ○ | ◎ | ◎ |
| Example 40 | A-2 | 0.1 | B-21 | 99.9 | ○○○ | ◎ | ○ | ◎ |
| Example 41 | A-3 | 0.5 | B-22 | 99.5 | ○○○ | ◎ | ○ | ◎ |
| Example 42 | A-3 | 2 | B-23 | 98 | ○○○ | ◎ | ○ | ◎ |
| Example 43 | A-3 | 5 | B-24 | 95 | ○○○ | ◎ | ○ | ◎ |
| Example 44 | A-2 | 0.1 | B-25 | 99.9 | ○○○ | ◎ | ○ | ◎ |
| Example 45 | A-3 | 0.5 | B-26 | 99.5 | ○○○ | ◎ | ○ | ◎ |
| Example 46 | A-1 | 1 | B-27 | 99 | ○○○ | ◎ | ○ | ◎ |
| Example 47 | A-3 | 0.1 | B-28 | 99.9 | ○○ | ◎ | ○ | ◎ |
| Example 48 | A-1 | 0.5 | B-30 | 99.5 | ○ | ◎ | ○ | ◎ |
| Example 49 | A-5 | 0.5 | B-27 | 99.5 | ○○○ | ○ | ○ | ◎ |
| Example 50 | A-8 | 0.1 | B-27 | 99.9 | ○○○ | ○ | ○ | ○ |
| Comparative example 1 | — | — | B-1 | 100 | ○○○ | X | ◎ | ◎ |
| Comparative example 2 | a-1 | 10 | B-29 | 90 | ○○○ | ○ | ◎ | X |
| Comparative example 3 | a-2 | 5 | B-1 | 95 | ○○○ | X | ◎ | X |

Details of the nonionic surfactant (B) indicated in Table 2 are as follows.
(Nonionic Surfactant (B))

B-1: polyoxyethylene (10 moles) lauryl ether
B-2: polyoxyethylene (8 moles) oleyl ether
B-3: polyoxyethylene (10 moles) C12-13 alcohol/α-dodecylamino-ω-hydroxy(polyoxyethylene) (10 moles)=70/30
B-4: polyoxyethylene (15 moles) C12-13 alcohol/α-dodecylamino-ω-hydroxy(polyoxyethylene) (10 moles)=50/50
B-5: polyoxyethylene (5 moles) oleyl ether/α-dodecylamino-ω-hydroxy(polyoxyethylene) (10 moles)=70/30
B-6: polyoxyethylene (15 moles) C12-13 alcohol/(polyoxyethylene)(polyoxypropylene) (n+m=8; n is the number of oxyethylene units, m is the number of oxypropylene units, and the same applies hereinafter) C12-13 alcohol=70/30
B-7: polyoxyethylene (10 moles) C12-13 alcohol/(polyoxyethylene)(polyoxypropylene) (n+m=8) C12-13 alcohol=50/50

B-8: polyoxyethylene (15 moles) C12-13 alcohol/(polyoxyethylene)(polyoxypropylene) (n+m=10) stearyl ether=50/50

B-9: (polyoxyethylene)(polyoxypropylene) (n+m=10) C12-C13 alcohol/α-dodecyl-ω-hydroxy(polyoxyethylene) (15 moles)/stearylamine(polyoxyethylene) (7 moles)=50/30/20

B-10: α-tridecyl-ω-hydroxy(polyoxyethylene)(polyoxypropylene) (n+m=8)/α-dodecylamino-ω-hydroxy(polyoxyethylene) (15 moles)=65/35

B-11: polyoxyethylene (10 moles) stearyl ether/(polyoxyethylene)(polyoxypropylene) (n+m=12) C11-14 alcohol/α-dodecylamino-ω-hydroxy(polyoxyethylene) (15 moles)=20/40/40

B-12: α-tridecyl-ω-hydroxy(polyoxyethylene)(polyoxypropylene) (n+m=14)/α-dodecylamino-ω-hydroxy(polyoxyethylene) (4 moles)/α-dodecylamino-ω-hydroxy(polyoxyethylene) (10 moles)=60/20/20

B-13: α-dodecyl-ω-hydroxy(polyoxyethylene)(polyoxypropylene) (n+m=10)/polyoxyethylene (3 moles) C12-14 alcohol/α-dodecylamino-ω-hydroxy(polyoxyethylene) (10 moles)/stearylamine(polyoxyethylene) (5 moles)=50/10/30/10

B-14: polyoxyethylene (10 moles) C12-13 alcohol/(polyoxyethylene)(polyoxypropylene) (n+m=8) C12-13 alcohol/α-dodecylamino-ω-hydroxy(polyoxyethylene) (10 moles)=30/30/40

B-15: polyoxyethylene (6 moles) decyl ether/(polyoxyethylene)(polyoxypropylene) (n+m=8) tridecyl ether/α-dodecylamino-ω-hydroxy(polyoxyethylene) (15 moles)=40/20/40

B-16: polyoxyethylene (9 moles) lauryl ether/(polyoxyethylene)(polyoxypropylene) (n+m=7) decyl ether/α-dodecylamino-ω-hydroxy(polyoxyethylene) (10 moles)=20/30/50

B-17: polyoxyethylene (9 moles) lauryl ether/(polyoxyethylene)(polyoxypropylene) (n+m=7) decyl ether/(polyoxyethylene)(polyoxypropylene) (n+m=8) C12-C13 alcohol/α-dodecylamino-ω-hydroxy(polyoxyethylene) (10 moles)=20/30/5/45

B-18: polyoxyethylene (10 moles) C11-14 alcohol/(polyoxyethylene)(polyoxypropylene) (n+m=7) C12-13 alcohol/α-dodecylamino-ω-hydroxy(polyoxyethylene) (15 moles)/coconut fatty acid-polyoxyethylene (7 moles)=30/30/30/10

B-19: polyoxyethylene (9 moles) lauryl ether/salt of polyoxyethylene (10 moles) dodecylamine ether and phosphoric acid=50/50

B-20: polyoxyethylene (10 moles) C12-13 alcohol/(polyoxyethylene)(polyoxypropylene) (n+m=8) C12-13 alcohol/salt of polyoxyethylene (10 moles) dodecylamine ether and phosphoric acid=45/45/10

B-21: polyoxyethylene (10 moles) C12-13 alcohol/α-dodecylamino-ω-hydroxy(polyoxyethylene) (10 moles)=40/60

B-22: α-tridecyl-ω-hydroxy(polyoxyethylene)(polyoxypropylene) (n+m=8)/α-dodecylamino-ω-hydroxy(polyoxyethylene) (15 moles)=35/65

B-23: polyoxyethylene (3 moles) C12-14 alcohol/polyoxyethylene polyoxypropylene (n+m=20) hydrogenated castor oil=30/70

B-24: α-dodecyl-ω-hydroxy(polyoxyethylene) (7 moles)/polyoxyethylene (10 moles) oleyl ester=20/80

B-25: (polyoxyethylene)(polyoxypropylene) (n+m=35) C12-13 alcohol/α-dodecylamino-ω-hydroxy(polyoxyethylene) (18 moles)=30/70

B-26: polyoxyethylene (7 moles) lauryl ether/polyoxyethylene (10 moles) oleyl ester=10/90

B-27: polyoxyethylene (10 moles) lauryl ether/coconut fatty acid-polyoxyethylene (10 moles)/sodium dodecyl sulfonate=10/80/10

B-28: α-decyl-ω-hydroxy(polyoxyethylene) (6 moles)/coconut fatty acid-polyoxyethylene (10 moles)/salt of polyoxyethylene (15 moles) dodecylamine ether and phosphoric acid=30/60/10

B-29: polyoxyethylene polyoxypropylene (n+m=20) hydrogenated castor oil/sodium dodecyl sulfonate=90/10

B-30: salt of polyoxyethylene (10 moles) dodecylamine ether and phosphoric acid

Experimental Part 2 (Preparation of Aqueous Liquids of Treatment Agents)

Each treatment agent prepared in Experimental Part 1 was added under stirring to ion exchanged water warmed to approximately 70° C. Complete dissolution was achieved to prepare a 5% aqueous liquid of the treatment agent.

Experimental Part 3 (Evaluation)

With each of the treatment agents of Examples 1 to 50 and Comparative Examples 1 to 3, the content of phosphorus in the treatment agent, the wet-state friction characteristic of fibers with the aqueous liquid adhered thereto, the wettability of the treatment agent, and the heat resistance of the treatment agent were evaluated by the procedures described below.

(Phosphorus Content of Treatment Agent)

With each treatment agent prepared in Experimental Part 1, 0.1 g were weighed out and diluted with distilled water to a total amount of 100 g. This dilute liquid was measured by an ICP emission spectrometry. A P element concentration was determined as the content of phosphorus in the treatment agent by comparison of intensity value with commercially available standard samples of known concentrations. The results of evaluating the phosphorus content according to the following three-step criteria are indicated in the "Phosphorus content (three-step evaluation)" column of Table 2.

Evaluation Criteria of Phosphorus Content
  ○○○: phosphorus content≤1,000 ppm
  ○○: 1,000 ppm<phosphorus content≤2,000 ppm
  ○: 2,000 ppm<phosphorus content (Wet-State Friction Characteristic)

The 5% aqueous liquid of each treatment agent prepared in Experimental Part 2 was diluted with ion exchanged water of approximately 25° C. to prepare a 0.35% aqueous liquid. 80 mL of the prepared 0.35% aqueous liquid were placed in a vat made of metal of 60 mm width×230 mm length×20 mm height.

A weight of rectangular plate shape of 30 mm width×90 mm length×45 mm height and 1 kg weight was prepared. A polyester spunbonded nonwoven fabric of the same size as a bottom surface of the weight was attached to the bottom surface using double-sided tape. The weight was placed with its bottom surface side, with the nonwoven fabric adhered thereon, facing downward in the vat containing the 0.35% aqueous liquid.

A tensile test of pulling the weight under an atmosphere of 20° C.×60% RH and a condition of horizontal speed of 100 mm/min was performed using a tensile tester (Autograph model AGS-X manufactured by Shimadzu Corporation) equipped with a load cell with a maximum load capacity of 50 N. The results of evaluating the wet-state friction characteristic according to the following criteria are indicated in the "Wet-state friction characteristic" column of Table 2.

In other words, the friction characteristic of the fibers and the metal in the wet state was evaluated by the above-described method. Specifically, the friction characteristic of the fibers and a roller made of the metal in a spinning step or a drawing step was evaluated by the above-described method. The above evaluation of friction characteristic was performed within 12 hours of preparation of the 0.35% aqueous liquid.

Evaluation Criteria of Wet-State Friction Characteristic
  ⊚ (satisfactory): An M/N ratio is not more than 0.98 that is a ratio of a friction N measured using the 0.35% aqueous liquid of Comparative Example 1 that does not contain any fatty acid (A) and a friction M measured using the 0.35% aqueous liquid of each example.
  ○ (fair): The M/N ratio is more than 0.98 but not more than 0.99.
  x (poor): The M/N ratio is more than 0.99.

(Wettability of Treatment Agent)

A nonwoven fabric fabricated from short fibers made of polyethylene terephthalate without the treatment agent applied thereto was prepared. 5 μl of the 0.35% aqueous solution prepared in the above-described evaluation of wet-state friction characteristic were dropped onto the nonwoven fabric and the time until complete permeation was measured. The results of evaluating the wettability of the treatment agent according to the following criteria are indicated in the "Wettability" column of Table 2.

Evaluation Criteria of Wettability of Treatment Agent
  ⊚ (satisfactory): Permeated in less than 150 seconds.
  ○ (fair): Permeated in not less than 150 seconds but less than 180 seconds.
  x (poor): Permeated in not less than 180 seconds.

(Heat Resistance of Treatment Agent)

The treatment agent of each of the Examples and Comparative Examples was weighed out such that a mass after drying would be approximately 2 g and dried of water content at 105° C. The mass after drying was measured and deemed to be an initial mass. Further, heating at 200° ° C. was performed for 15 hours and a residue rate (%) (mass after heating/initial mass) at this point was measured. The results of evaluating the wettability of the treatment agent according to the following criteria are indicated in the "Heat resistance" column of Table 2.

Evaluation Criteria of Heat Resistance of Treatment Agent
  ⊚ (satisfactory): Residue rate was less than 35%.
  ○ (fair): Residue rate was not less than 35% but less than 50%.
  x (poor): Residue rate was not less than 50%.

The short fiber treatment agent of the present invention is substantially free of an organic phosphoric acid ester compound. The short fiber treatment agent of the present invention can improve the friction characteristic in a wet state of short fibers with the short fiber treatment agent adhered thereto. It can also improve the wettability and the heat resistance of the short fiber treatment agent.

The invention claimed is:

1. A short fiber treatment agent for treating a short fiber, being substantially free of an organic phosphoric acid ester compound and comprising a fatty acid (A) and a nonionic surfactant (B), wherein
   if the sum of the contents of the fatty acid (A) and the nonionic surfactant (B) in the short fiber treatment agent is taken as 100 parts by mass, the short fiber treatment agent contains the fatty acid (A) at a ratio of not less than 0.001 parts by mass and not more than 10 parts by mass and the nonionic surfactant (B) at a ratio of not less than 90 parts by mass and not more than 99.999 parts by mass,
   a nonionic surfactant (B1) is contained in an amount of at least 50% by mass or more based on the total mass of the nonionic surfactant (B),
   the fatty acid (A) is at least one selected from the group consisting of a fatty acid with 1 to 6 carbon atoms, a hydroxy fatty acid with 1 to 6 carbon atoms, and a salt thereof, and
   the nonionic surfactant (B1) is a compound in which an alkylene oxide with 2 to 4 carbon atoms is added at a ratio of 3 to 30 moles with respect to 1 mole of a monohydric or dihydric alcohol.

2. The short fiber treatment agent according to claim 1, wherein the content of phosphorus detected by an ICP emission spectrometry is not more than 2,000 ppm.

3. The short fiber treatment agent according to claim 1, wherein the fatty acid (A) is at least one selected from the group consisting of a fatty acid with 1 to 4 carbon atoms, a hydroxy fatty acid with 1 to 4 carbon atoms having a hydroxy group in its molecule, and an alkali metal salt thereof.

4. The short fiber treatment agent according to claim 1, wherein the short fiber is a polyester short fiber.

5. The short fiber treatment agent according to claim 1, wherein the short fiber is for spun yarn production.

6. The short fiber treatment agent according to claim 1, wherein the short fiber treatment agent is used in a spinning and drawing step.

7. An aqueous liquid of short fiber treatment agent, comprising the short fiber treatment agent according to claim 1 and water.

8. A method for treating a short fiber, comprising applying to a short fiber an aqueous liquid of short fiber treatment agent in which the short fiber treatment agent according to claim 1 is mixed with water.

9. A method for producing a short fiber, comprising applying to a short fiber an aqueous liquid of short fiber treatment agent in which the short fiber treatment agent according to claim 1 is mixed with water in a spinning and drawing step.

10. A short fiber to which the short fiber treatment agent according to claim 1 is adhered thereto.

* * * * *